United States Patent [19]

Shimizu

[11] Patent Number: 4,692,708
[45] Date of Patent: Sep. 8, 1987

[54] TIME BASE CORRECTION CIRCUIT

[75] Inventor: Tetsuo Shimizu, Saitama, Japan

[73] Assignee: Pioneer Electronic Corporation, Tokyo, Japan

[21] Appl. No.: 706,356

[22] Filed: Feb. 27, 1985

[30] Foreign Application Priority Data

Feb. 29, 1984 [JP] Japan .............................. 59-29643[U]

[51] Int. Cl.[4] .......................... H03K 1/17; H03K 5/13; H04N 5/78; H04N 9/89
[52] U.S. Cl. ..................................... 328/63; 307/606; 307/271; 360/36.1; 358/320; 358/337
[58] Field of Search ...................... 328/63, 72, 162, 58; 307/271, 511, 606; 360/36.1, 36.2; 358/320, 327, 339, 337, 343; 377/61, 62, 57

[56] References Cited

U.S. PATENT DOCUMENTS

| 4,283,696 | 8/1981 | Goser | 377/57 |
| 4,532,541 | 7/1985 | Cooper | 358/337 |
| 4,555,734 | 11/1985 | Fukui | 360/36.1 |

FOREIGN PATENT DOCUMENTS

| 2753535 | 6/1979 | Fed. Rep. of Germany | 360/36.1 |
| 0009319 | 1/1977 | Japan | 360/36.1 |

OTHER PUBLICATIONS

Sadashige, "Overview of Time-Base Correction Techniques and Their Applications", Oct. 1976, vol. 85, No. 10, pp. 787-791, SMPTE Journal.
Acker, "Digital Time-Base Correction for Video Signal Processing", Mar. 1976, vol. 85, pp. 146-149, SMPTE Journal.

Primary Examiner—Stanley D. Miller
Assistant Examiner—Trong Quang Phan
Attorney, Agent, or Firm—Sughrue, Mion, Zinn, Macpeak & Seas

[57] ABSTRACT

A time base correction circuit for correcting time base error commonly present in two or more signals having components in different frequency bands, wherein the number of stages of the respective clock response delay elements is reduced. A single clock generator supplies clock pulse signals for plural clock response delay elements. The clock generator output is connected directly to the clock response delay element to which is applied the input signal having the highest frequency component. Frequency dividers are connected between the clock generator and each of the other clock response delay elements.

2 Claims, 3 Drawing Figures

TIME BASE CORRECTION CIRCUIT

BACKGROUND OF THE INVENTION

The present invention relates to a time base correction circuit employing clock response delay elements such as charge-coupled devices (CCD) which operate in response to clock pulses.

Time base correction circuits for correcting the same time base error present in two input signals in different frequency bands include circuits employing clock response delay elements such as CCDs as time base correction elements.

FIG. 1 shows a signal processing circuit of a video disk player equipped with such a time base correction circuit using CCDs. The time correction circuit includes two CCDs 2 and 3, a voltage-controlled oscillator (VCO) 4 for generating a common clock pulse signal (hereinafter simply called the "clock") for driving the CCDs, and a time base error detector 5 for detecting the time base error present in the video signal and applying the detected output to the VCO 4.

The regenerative RF input signal consists of a regenerative video signal and a regenerative audio FM signal. The regenerative video signal is demodulated by a video detector 6 before being applied to the CCD 2, whereas the regenerative audio FM signal is applied to the CCD 3. When the regenerative RF input signal has a time base error, the demodulated video signal and the regenerative audio FM signal applied to the CCDs have the same time base error.

The time base error detector 5 detects the time base error present in the video output signal and supplies the detected output to the VCO 4. The VCO 4 produces a clock having a frequency determined by the detected output voltage and applies the clock to the CCDs 2 and 3. These CCDs, being driven by the clock, impart the same delay time to the demodulated video signal and regenerative audio FM signal in directions canceling the time base error common to them to effect time base correction. The output signal of the CCD 2 and that of the CCD 3, which is demodulated by an audio detector 7, are outputted as video and audio signals, respectively.

Assuming that the number of CCD stages, i.e., the number of stages in the transfer section of the CCD, is N and the frequency of the driving clock is $f_c$ (MHz), the CCD delay time $T_d$ (microseconds) is represented by the following equation:

$$T_d = N/f_c. \tag{1}$$

As is obvious from the above equation, the delay time can be changed by changing the clock frequency $f_c$.

Assuming that the time base error present in the regenerative RF input signal has a maximum deviation of $\Delta T_{max}$, the possible variation width $\Delta T_{d\,max}$ of CCDs 2 and 3 delay time must be $\Delta T_{max}$ or more to successfully subject the demodulated video and regenerative audio FM signals to time base correction.

The variation width $\Delta T_d$ of the delay time when thee frequency for driving the N stage CCD is changed from $f_1$ to $f_2$ is generally given by the following equations (based on the preceding equation (1)):

$$T_{d1} = N/f_1, \text{ and}$$

$$T_{d2} = N/f_2,$$

where $T_{d1}$ = delay time of the CCD corresponding to $f_1$, and $f_2$ = clock frequency. If $f_1 < f_2$, $\Delta T_d$ can be represented by:

$$\Delta T_d = T_{d1} - T_{d2} = N/f_1 - N/f_2 = N(1/f_1 - 1/f_2). \tag{2}$$

In the time base correction circuit of FIG. 1, the same time error is present in the demodulated video and the regenerative audio FM signals respectively applied to the CCDs 2 and 3 so that time base correction may be effected by providing the same delay time variation width in the CCDs 2 and 3. In the time base correction circuit 1 of FIG. 1, a clock of the same frequency is supplied to the CCDs 2 and 3 as a common clock from the VCO 4 is used for the CCDs 2 and 3. Consequently, as is evident from equation (2), the number stages of the CCD 2 must be the same as that of the CCD 3 to allow the CCDs 2 and 3 to effect the same delay time variation width.

Further analysis will be made taking an optical video disk player using the PAL system as an example.

The demodulated video signal applied to the CCD 2 has a frequency range of 0 to 5 MHz, whereas the audio FM signal applied to the CCD 3 employs FM carriers with frequencies of approximately 0.7 and 1.1 MHz. As a result, a signal of a frequency band wider than that for the signal applied to the CCD 3 is applied to the CCD 2, and the highest frequency of the signal applied to the CCD 2 is 5 MHz, whereas that applied to the CCD 3 is 1.1 MHz.

Since a CCD is generally a sampling element, a clock frequency $f_c$ twice or more as high as the highest frequency of the input signal is deemed satisfactory based upon well-known sampling theory; however, the former is normally set three times as high or higher in view of the characteristics of the CCD. Accordingly, the clock frequency for the CCD 2 has only to satisfy:

$$f_c \geq 5 \times 3, \text{ i.e., } f_c \geq 15 \text{ MHz}, \tag{3}$$

and that for the CCD:

$$f_c \geq 1.1 \times 3, \text{ i.e., } f_c \geq 3.3 \text{ MHz}. \tag{4}$$

In other words, when the maximum deviation $\Delta T_{max}$ of the time base error present in the regenerative RF input signal is subjected to time base correction, the lowest frequency $f_{min}$ of the clock has only to satisfy equations (3) and (4). When a common clock is used for the CCDs 2 and 3, as in the case of the time base correction circuit 1 of FIG. 1, the lowest frequency $f_{min}$ of the clock generated by the VCO 4 satisfies equation (3).

A minimum possible value $N_{min}$ in the number of CCD stages necessary for subjecting to time base correction the maximum deviation $\Delta T_{max}$ of the regenerative RF input signal will now be considered. The highest frequency $f_{max}$ of the clock may not be set higher without limitation but is limited depending on the performance of the element or the CCD. About 20 MHz is generally considered to be an upper limit in view of present technology. On the basis of equation (2), the possible delay time variation width $\Delta T_{d\,max}$ for the CCD is thus given by:

$$\Delta T_{d\,max} = N(1/f_{min} - 1/f_{max}). \tag{5}$$

In view of the foregoing, the maximum possible delay time variation width $\Delta T_{d\,max}$ for the CCD must be greater than the maximum deviation $\Delta T_{d\,max}$ of the time base error present in the regenerative RF input signal. Assuming that the time base correction circuit 1 is designed to satisfy $\Delta T_{d\,max} = \Delta T_{max}$, the minimum number $N_{min}$ or CCD stages on the basis of equation (5) is expressed by:

$$\Delta T_{max} = N_{min}(1/f_{min} - 1/f_{max}). \quad (6)$$

In equation (6), $\Delta T_{max}$ is set to meet design requirements and $f_{min}$ is determined by equations (3) and (4), whereas $f_{max}$ is determined by the performance of the CCD element.

Assuming that the maximum deviation $\Delta T_{max}$ of the RF input signal is 10 microseconds and that the highest frequency $f_{max}$ of the clock is 20 MHz, equation (6) becomes:

$$10 = N_{min\text{-}1}(1/f_{min} - 1/20).$$

If a common clock is not supplied to the CCDs 2 and 3 and instead clocks of different frequencies are supplied thereto, and if $N_{min\text{-}1}$ and $N_{min\text{-}2}$ represent minimum numbers of stages of the CCDs 2 and 3 respectively, and $f_{min} = 15$ MHz (from equation (3)):

$$10 = N_{min\text{-}1}(1/15 - 1/20). \quad (7)$$

Thus, $N_{min\text{-}1} = 600$.
For $f_{min} = 3.3$ MHz (from equation (4)), for the CCD 3:

$$10 = N_{min\text{-}2}(1/3.3 - 1/20). \quad (8)$$

Thus, $N_{min\text{-}2} = 40$.

Accordingly, if clocks of different frequencies are supplied to the CCDs 2 and 3 in the time base correction circuit of FIG. 1, more than 600 and 40 stages should be provided for the CCDs 2 and 3, respectively.

In the time base correction circuit of FIG. 1, however, the number of stages of the CCD 2 must, as above described, be the same as that of the CCD 3 since a common clock is used for the CCDs 2 and 3; that is, they must have more than 600 stages. Consequently, a CCD possessing stages lmore than otherwise necessary is employed for the CCD 3.

The greater the number of stages in the CCD, the greater the chip area generally becomes when the CCD is fabricated in IC form. This results in higher costs and an increase in power consumption.

SUMMARY OF THE INVENTION

It is therefore an object of the present invention to provide a time base correction circuit using CCDs as time base correction elements arranged so as to reduce the number of CCD stages.

In a time base correction circuit constructed according to the present invention, the clock is supplied directly from a VCO to a CCD to which is applied an input signal having the highest frequency component among the input signals. To the other CCDs is applied a clock whose frequency has been divided down. Accordingly, the number of CCD stages is reduced to what is suitable.

DESCRIPTION OF THE PREFERRED EMBODIMENTS

Figure 1:
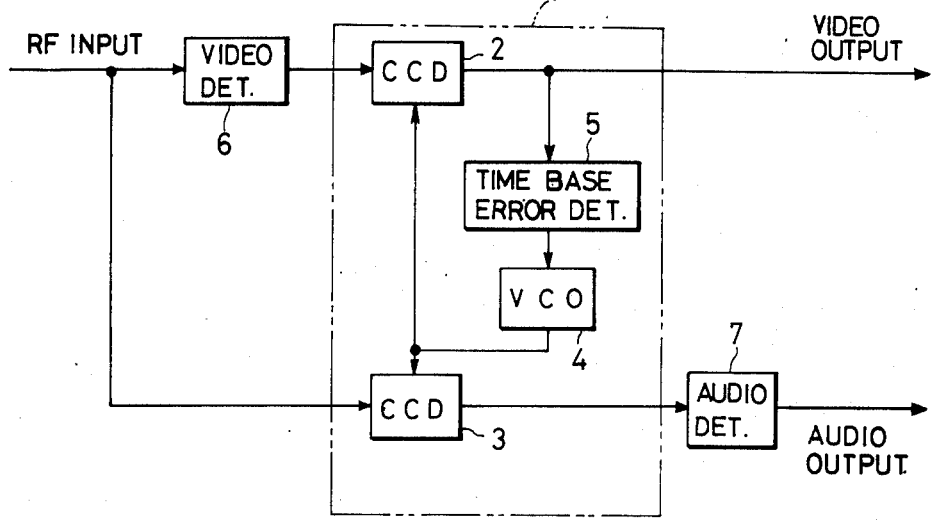
FIG. 1 is a diagram illustrating a conventional time base correction circuit.
Figure 2:
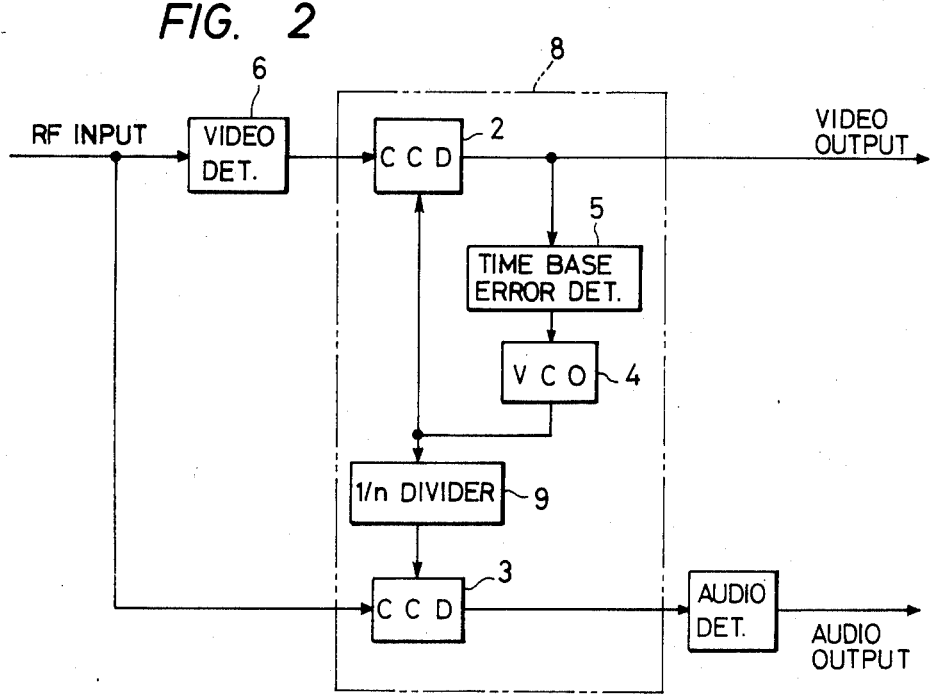
FIG. 2 is a diagram illustrating an embodiment of the present invention.

FIG. 2 shows a time base correction circuit 8 embodying the present invention, the circuit being provided in an optical video disc player similar to what is shown in FIG. 1. The differences between the two circuits are the provision of a 1/n divider 9 between the VCO 4 and CCD 3, and the fact that the number of stages of the CCD 2 is made different from the number of stages of the CCD 3. The remaining parts of the circuit construction are the same as in the case of FIG. 1, and like elements having like functions are identified like reference numerals.

In this time base correction circuit, the time base error detector 5 detects the time base error present in a video output signal and supplies the detected output to the VCO 4. The VCO 4 produces a clock of a frequency corresponding to the input voltage and supplies the clock to the CCD 2 and the 1/n divider 9. The 1/n divider reduces the frequency of the input clock by a factor of 1/n and applies the resulting clock to the CCD 3. The CCDs 2 and 3, due to their different lengths, provide the same delay time variation width to the demodulated video and regenerative audio FM signals using the clocks of different frequencies to effect the time base correction.

When the clocks of the lowest frequency $f_{min}$ and the highest frequency $f_{max}$ are supplied to the CCD 2, clocks of frequencies of $f_{min}/n$ and $f_{max}/n$, respectively, are supplied to the CCD 3.

If the minimum possible value $N_{min\text{-}1}$ of the number of stages of the CCD 2 is determined on the basis of the same design requirements as have been described with reference to FIG. 1, the value of $N_{min\text{-}1}$ can be obtained from equation (6) above as:

$$\Delta T_{max} = N_{min\text{-}1}(1/f_{min} - 1/f_{max}). \quad (9)$$

The minimum value $N_{min\text{-}2}$ of the number of stages of the CCD 3 is given by:

$$\Delta T_{max} = N_{min-2}(1/f_{min}/n - 1/f_{max}/n) \quad (10)$$
$$= N_{min-2} \cdot n(1/f_{min} - 1/f_{max}).$$

From equations (9) and (10), the following relation is obtained:

$$n \cdot N_{min\text{-}2} = N_{min\text{-}1}$$

$$N_{min\text{-}2} = N_{min\text{-}1}/n. \quad (11)$$

Thus, the minimum value of the number of stages of the CCD 3 must be 1/n of the minimum possible value of the number of the stages of the CCD 2.

The value of n will subsequently be discussed. Since a clock or frequency $f_{min}/n$ is supplied to the CCD 3 when a clock of the lowest frequency $f_{min}$ is supplied to the CCD 2, n must satisfy:

$$f_{min} = 15 \text{ MHz and} \quad (12)$$

$$f_{min}/n \geqq 3.3 \text{ MHz}, \quad (13)$$

based on equations (3) and (4) above. Thus, $$n \leq 15/3.3, \text{ and thus,}$$

$$n \leq 4.5 \quad (14)$$

is obtained from equations (12) and (13). The maximum integer satisfying equation (14) is n=4, and thus:

$$N_{min-2} = 600/4 = 150.$$

It has been proved satisfactory for the CCD 3 to possess at least 150 stages.

Although the description above relates to a circuit provided in an optical video disc player, use of such a circuit is not limited to an optical video disc player. Also, more than one signal whose frequency band is different from another may simultaneously be subjected to time base correction.

Figure 3:
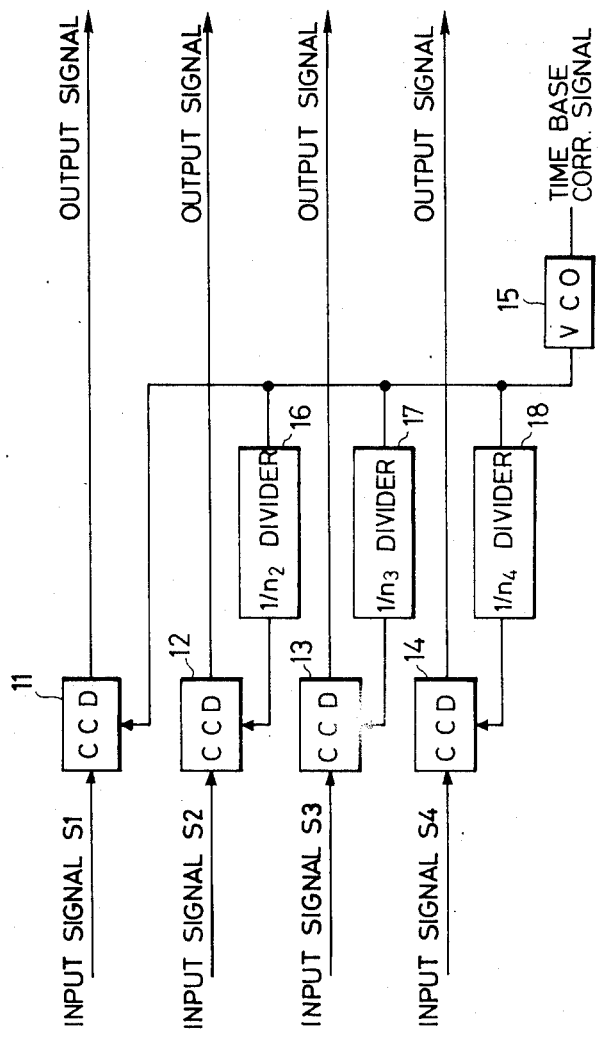
FIG. 3 is a diagram illustrating another embodiment of the present invention.

FIG. 3 is a diagram illustrating such an embodiment. This time base correction circuit includes CCDs 11, 12, 13 and 14 used for subjecting to time base correction the same time base error present in input signals S1, S2, S3 and S4; a VCO 15 for generating the clock; a 1/n₂ divider 16 connected between the CCD 12 and VCO 15; a 1/n₃ divider 17 connected between the CCD 13 and VCO 15; and a 1/n₄ divider 18 connected between the CCD 14 and VCO 15.

It is assumed that the highest frequency component is contained in the signal S1. To the CCD 11 to which the input signal S1 is supplied, a clock is supplied from the VCO 15 having a frequency suitable for that CCD. The other CCDs 12, 13 and 14 receive clocks reduced by factors of 1/n₂, 1/n₃ and 1/n₄ by the dividers 16, 17 and 18, respectively. In this case, assuming the minimum possible number of stages of the CCD 11, 12, 13 and 14 are $N_{min-1}$, $N_{min-2}$, $N_{min-3}$, $N_{min-4}$, the following relations, as in the case of the embodiment described in FIG. 2, are established:

$$N_{min-2} = N_{min-1}/n_2,$$

$$N_{min-3} = N_{min-1}/n_3, \text{ and}$$

$$N_{min-4} = N_{min-1}/n_4.$$

The number of stages of the CCDs 12, 13 and 14 are properly set to satisfy these relations. If a CCD which has a number of stages $N_1$ ($\leq N_{min-1}$) is used for the CCD 11, the numbers of stages of the CCDs 12, 13 and 14 are determined by:

$$N_2 = N_1/n_2,$$

$$N_3 = N_1/n_3, \text{ and}$$

$$N_4 = N_1/n_4.$$

When a plurality of signals having the same time base error but different frequency bands are subjected to time base correction in the time base correction circuit according to the present invention, no common clock is supplied to clock response delay elements, such as CCDs, for subjecting to time base correction the time base error present in each signal, and a clock divided by dividers is supplied to the clock response delay elements other than that subjecting to time base correction the signal having the highest frequency component. Accordingly, the number of clock response delay element stages is reduced in proportion to the dividing ratio so that a less costly and less power consumptive time base correction circuit is obtained.

Although CCDs are used as clock response delay elements in the above-described embodiments of the present invention, BBDs and bubble elements, for instance, are also usable as clock response delay elements.

I claim:

1. In a time base correction circuit comprising: a plurality of clocked delay elements for correcting the same time base error present in a plurality of input signals, and a single clock generator for supplying clock pulse signals to said clocked delay elements, the improvement wherein a frequency divider is provided between said clock generator and each clocked delay element other than the one to which an input signal among said plurality of input signals having a highest maximum frequency is supplied.

2. The time base correction of claim 1, wherein a divisor n for each said frequency divider is determined as a largest integer satisfying $n \leq N_{min-1}/N_{min-2}$, where $N_{min-1}$ is a minimum number of stages of said one clocked delay element and $N_{min-2}$ is a minimum number of stages of the clocked delay element corresponding to said frequency divider.

* * * * *